US006033756A

United States Patent [19]

Handscomb

[11] Patent Number: 6,033,756

[45] Date of Patent: Mar. 7, 2000

[54] APPARATUS FOR AND METHOD OF ATTENUATING ACOUSTIC ENERGY

[75] Inventor: Paul Handscomb, Taunton, United Kingdom

[73] Assignee: Pritex Limited, United Kingdom

[21] Appl. No.: 08/984,498

[22] Filed: Dec. 3, 1997

[30] Foreign Application Priority Data

| | | | |
|---|---|---|---|
| Dec. 4, 1996 | [GB] | United Kingdom | 9625182 |
| Mar. 14, 1997 | [GB] | United Kingdom | 9705402 |

[51] Int. Cl.[7] ................................ B32B 5/24; B32B 5/32; E04B 1/82

[52] U.S. Cl. .......................... 428/138; 181/286; 181/288; 181/293; 181/295; 428/314.8; 428/316.6

[58] Field of Search ................................ 428/138, 316.6, 428/314.4, 314.8; 181/286, 288, 293, 295; 381/353

[56] References Cited

U.S. PATENT DOCUMENTS

| | | | |
|---|---|---|---|
| 4,121,960 | 10/1978 | Focht | 156/219 |
| 4,128,682 | 12/1978 | Nomura et al. | 428/138 |
| 4,172,168 | 10/1979 | Klaffke et al. | 428/138 |
| 4,256,797 | 3/1981 | Stamper et al. | 428/215 |
| 4,263,356 | 4/1981 | Nomura et al. | 428/138 |
| 4,559,255 | 12/1985 | Shimode et al. | 428/138 |
| 5,460,870 | 10/1995 | Arthurs | 428/285 |

FOREIGN PATENT DOCUMENTS 1415852 11/1975 United Kingdom .

*Primary Examiner*—Blaine Copenheaver
*Attorney, Agent, or Firm*—Baker Botts, L.L.P.

[57] ABSTRACT

A sound attenuating element is provided which comprises a closed cell foam layer (2) having a plurality of channels (4) formed therein. The element is, in use, placed adjacent a surface such that an air gap is formed between the foam layer and the surface. The channels couple to the air gap to form a plurality of Helmholtz resonators.

12 Claims, 6 Drawing Sheets

Acoustic Absorption of closed-cell Foam Composite
Closed cell with 3mm perforations in 15mm grid
pattern

APPARATUS FOR AND METHOD OF ATTENUATING ACOUSTIC ENERGY

The present invention relates to an apparatus for, and method of, attenuating acoustic energy.

It is known to place a perforated facing adjacent, but separated from, an acoustically reflective surface in order to form an air space between the facing and the surface. The air space forms a plurality of Helmholtz cavities coupled to acoustic energy impinging on the facing via the perforations. Such an arrangement has been used to achieve a tuned sound absorption characteristic in applications such as building ceilings. The absorption peaks in such an arrangement are limited to higher frequencies and narrower bandwidths than are ideal. Flexible perforated headlinings have been used in vehicles but their use has declined due to the manufacturer's requirement to use a self-supporting headlining in order to simplify the manufacturing process.

According to a first aspect of the present invention, there is provided a sound attenuating element comprising a foam layer having a plurality of channels extending therethrough.

It is thus possible to provide a sound absorbing element which, in use, defines a series of apertures for coupling acoustic energy incident on a first side of the material of the sound attenuating element to an air space adjacent a second side of the material. The sound attenuating element comprises a foam having a closed cell construction.

Preferably the air space on the second side of the sound attenuating element is bounded by an opposing surface. It will be appreciated that if the distance between the foam layer and the opposing surface is small compared to the surface area of the layer, then the air gap on the second side of the material can be considered to be at least one cavity from an acoustic point of view, even though it may not be strictly enclosed.

Each aperture is effectively coupled to an associated acoustic volume, even though neighbouring volumes are not separated by a wall. Neighbouring volumes may overlap one another. However, a dividing element may be provided intermediate the second side of the sound attenuating element and the opposing surface to divide the volume defined therebetween into a plurality of individual cavities. The dividing element may, for example, be a honeycomb of plastics or resinated paper.

Advantageously, a further layer of foam having different acoustic properties, or a layer of open cell or fibrous material is provided adjacent at least a portion of the closed cell layer. Such a foam, open cell or fibrous material may serve to define the gap between the first foam layer, which may be a closed cell layer and the opposing surface. The surface of the foam, open cell or fibrous material may be modified to define the opposing surface or be adapted to carry a layer of material thereon which acts as the opposing surface. Advantageously the opposing surface substantially inhibits bulk movement of gas, and may be gas impermeable. Additionally, the foam, open cell or fibrous material extends into the acoustic volumes associated with at least some of the apertures and lowers the quality factor, Q, of at least one Helmholtz resonator associated with at least one of the apertures. The foam, open cell or fibrous material may be provided in combination with the dividing element. Tis dampening material may be less dense than the other layers.

Advantageously, the resonant frequencies of the resonators may be tuned. This can be achieved by varying the gap between the foam layer and the opposing surface, by changing the spacing between adjacent channels, the diameter of the channels or the thickness of the foam (and hence the length of the channels). Thus different part of the material may have different attenuation characteristics.

The channels and air gap act as a series of Helmholtz resonators.

Advantageously the foam layer is a closed cell layer. The closed cell layer may be comprised of a thermo-plastic material. However, many materials such as polyurethane, polyethylene, polypropylene, neoprene, rubber or phenolic foams may be used to form the closed cell layer. Preferably the closed cell layer is sufficiently rigid to be self-supporting. The closed cell layer may be moulded to form an automobile component, such as a vehicle headlining or other sound deadening components. Furthermore, where the component is rigid it may be used also as a shock absorbing component replacing an existing shock absorbent component. The sound absorbing element may also be used to reduce sound levels in factories, around large machines (such as compressors), within machines (such as vacuum cleaners) or within ventilation systems, to name but a few examples.

Alternatively the first and further layers may be integrally formed of the same material but moulded using different techniques or conditions to give different densities between the layers.

Advantageously the fir; surface of the closed cell layer may have a facing material attached or adjacent thereto. The facing material may be arranged to provide a decorative finish, such as a knitted or non-woven fabric or flock sprayed fibre, or may form a protective layer to prevent the ingress of dirt into the passages. Additionally, the facing material may be arranged to provide attenuation at relatively high frequencies, for example from 500 Hz upwards, but more typically from 2 kHz upwards.

Advantageously a reflective and/or conductive layer may be provided on or adjacent either or both sides of the foam layer or the foam and further layer. This may provide fire retardants and/or radio frequency interference screening properties.

Advantageously the closed cell layer has a thickness greater than 5 mm. The closed cell layer has a preferred thickness in the range of 5 to 50 mm.

According to a second aspect of the present invention, there is provided a sound attenuating element comprising a first layer of material having a closed cell structure with a plurality of passages extending therethrough, and a second layer of material having an open cell or fibrous structure, the element, in use, being arranged with the second layer adjacent a surface.

According to a third aspect of the present invention, there is provided a method of attenuating sound comprising the steps of placing a sound attenuating element according to the first aspect of the present invention adjacent a surface.

According to a fourth aspect of the present invention, there is provided a method of attenuating sound comprising the steps of placing a sound attenuating element according to a second aspect of the present invention adjacent a surface.

The present invention will further be described, by way of example, with reference to the accompanying drawings, in which.

Figure 1:
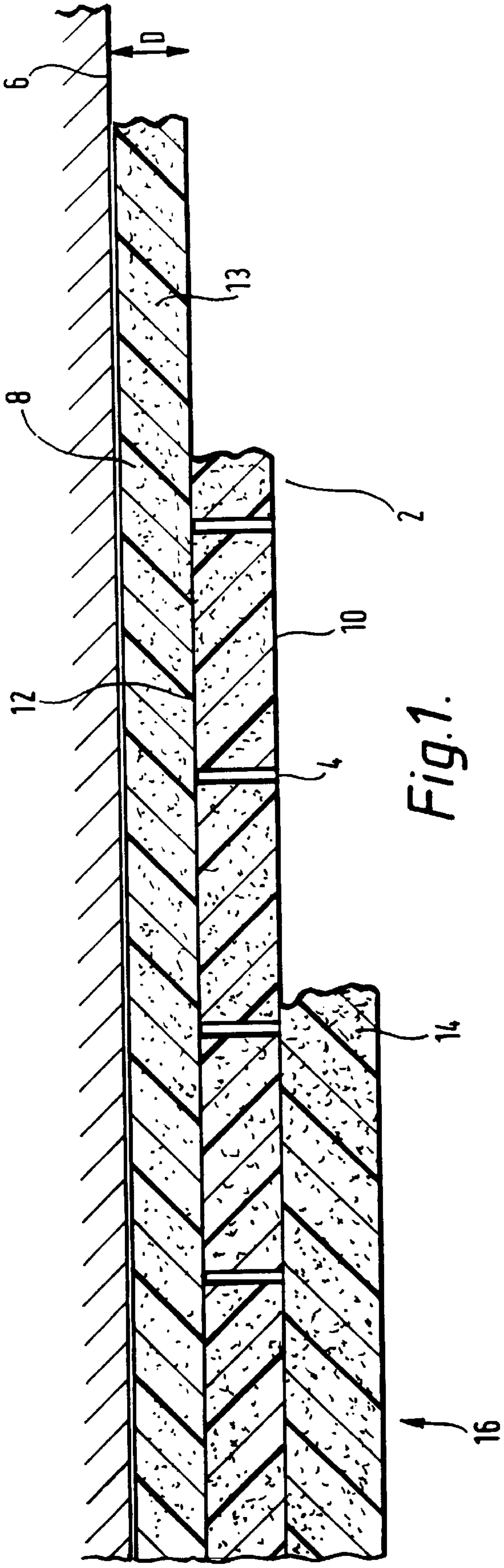
FIG. 1 is a schematic cross-section through an acoustic panel constituting a first embodiment of the present invention.
Figure 7:
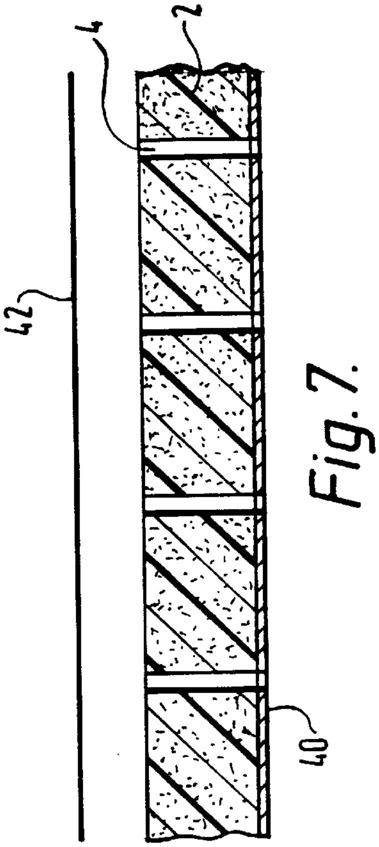
FIG. 7 is a cross-section of an acoustic panel constituting a further embodiment of the present invention.

The acoustic panel shown in FIG. 1 comprises a layer of closed cell foam 2 having a plurality of channels 4 extending therethrough. The closed cell foam 2 is positioned adjacent a panel 6, which may be a wall, a bulk head, a casing or a roof component. The panel 6 and the layer 2 serve to define an air gap 8 therebetween. The gap 8 may be bounded by side walls, not shown, so as to form an enclosed volume, although this is not necessary provided that the spatial extent of the closed cell foam layer 2 is much greater than the depth D between the panel 6 and the surface of the foam layer 2 facing the panel 6. The layer 2 is formed of a rigid closed cell polyurethane thermo-formable foam and is 0.15 mm thick. The passages 4 extend completely through the foam and are perpendicular to the surface thereof. The passages 4 have a diameter of 3 mm. The passages 4 are arranged in a two-dimensional array comprising rows and columns. Each passage 4 effectively communicates with an associated acoustic volume whose dimension approximates to the product of the distance between neighbouring holes in the column, the distance between neighbouring rows, and the depth of the air space. Thus it can be seen that the air space 6 is effectively partitioned into a plurality of volumes, each of which is cented about its respective passage 4 and which is bounded by its neighbouring acoustic volumes. A dividing element (not shown) may be provided to divide the air gap into a plurality of cavities. The dividing element may be a resin impregnated paper honeycomb which serves both to increase the stiffness of the panel and to define the acoustic volumes. This may enhance absorption of sound arriving at oblique angles of incidence.

Each passage 4 effectively acts as a neck coupling the acoustic volume to energy impinging on a front surface 10 of the foam layer 2. Each neck and associated volume forms a Helmholtz resonator. Conventionally, a Helmholtz resonator comprises a bounded cavity coupled to its environment via a neck. It will be appreciated that there may be no walls extending perpendicularly to the inner face 12 of the closed cell foam layer 2, but nevertheless the system's behaviour still approximates that of a Helmholtz resonator.

The resonant frequency of the Helmholtz resonator is defined by:

$$f=(c/2\pi)s^{1/2}(LV)^{-1/2}$$

where:

f equals the resonant frequency of the resonator;

c=the velocity of sound in air, s=the area of cross-section of the neck;

L=the effective length of the passage (including any corrections); and

V=the volume of the cavity.

The plug of air in the neck effectively oscillates on a spring of air formed within the cavity. The Q factor of the cavity can be reduced by damping the motion of the air therein. This can be achieved by the insertion of an open cell foam of fibrous material which serves to inhibit the motion of gas within the cavity. The inclusion of damping material 13 allows the absorption versus frequency characteristic to be tailored so as to become less notched and this widens the acceptance bandwidth of the cavity. Thus the damped resonator has a shallower but broader attenuation peak- compared to an undamped resonator. The spacing of the channels may be selected in accordance with the use to which the acoustic panel is to be put Thus if the panel is to be included within an automobile, the panel may be tuned in order to provide maximum attenuation at resonant frequencies of the car, of the engine or of noise produced from the gearbox or other transmission elements, for example. The panel may further be provided with a front face 14 of open cell foam or fibrous material which serves to attenuate high frequency components. The open cell foam 14 is effectively acoustically transparent at lower frequencies and hence does not substantially affect the operation of the Helmholtz resonators. In fact, the provision of the front face 14 tends to broaden and lower the resonance peak due to the additional damping of the oscillating gas in the channels 4. A forwardly facing face 16 of the panel may have a fabric-like finish applied thereto in order to make the panel visually acceptable for use inside cars or buildings, or may be faced with a dirt resistant finish when the panel is used within machinery, ducts, or other areas not normally visible.

FIGS. 2 to 5 demonstrate a series of test results. In each case a panel portion of 50 mm diameter was tested. The closed cell foam panel 2 was 15 mm thick and was separated from the adjacent surface 6 by a 12 mm gap, which was either air filled or filled with an open cell foam. The channels had L diameter of 3 mm and were set in square arrays of either 20 mm×20 mm or 10 mm×10 mm, thereby giving approximate resonator volumes of $4.8\times10^{-6}$ and $1.2\times10^{-6}$ $m^3$ respectively. Thus the fundamental frequencies would be expected to be 536 Hz and 1072 Hz, respectively. However, this ignores any end corrections which need to be made to the effective length of the channel.

Figure 2:
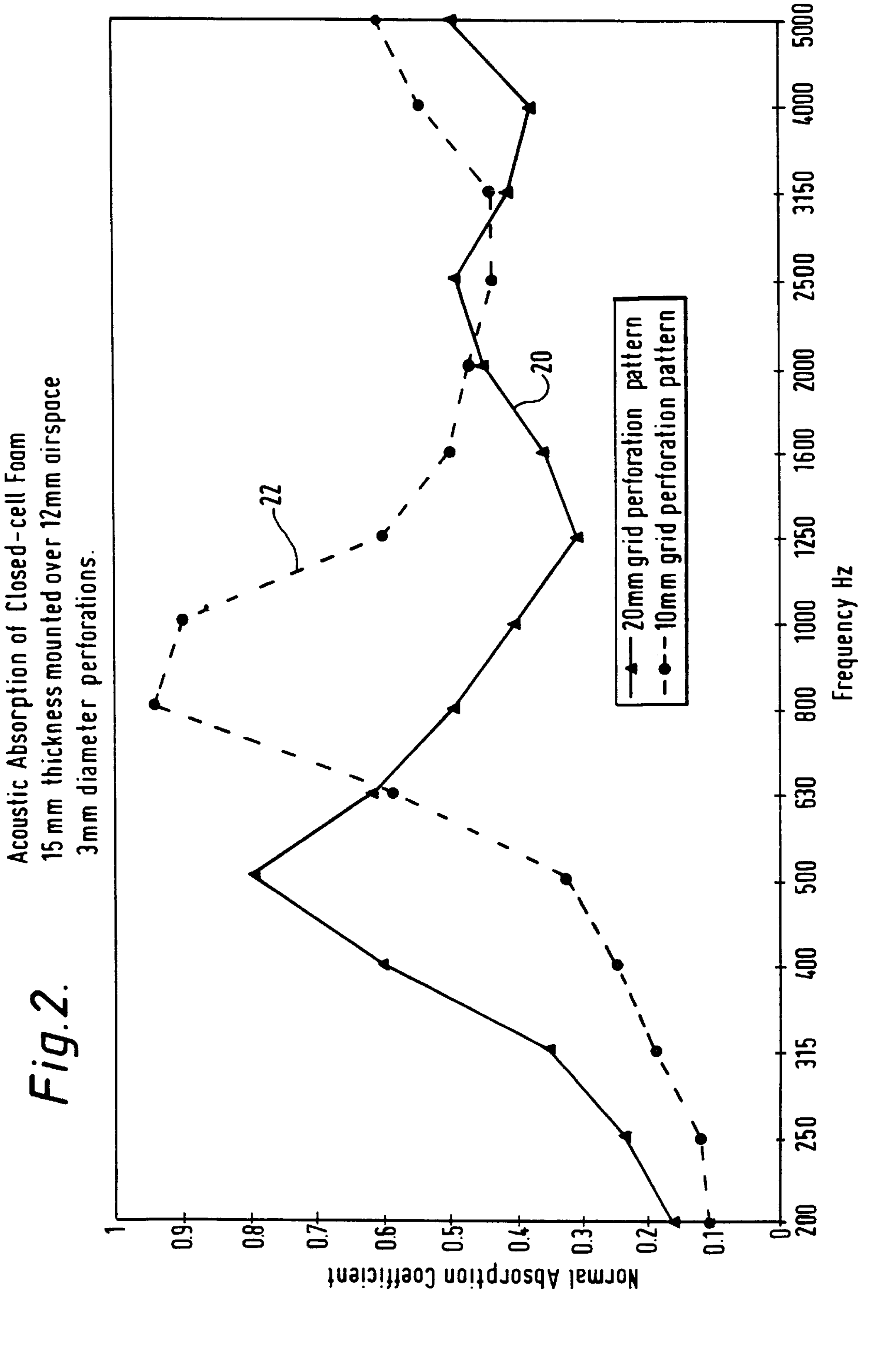
FIG. 2 is a graph illustrating absorption coefficient versus frequency for a rigid polyurethane closed cell foam in association with a 12 mm air space.

Line 20 in FIG. 2 plots the absorption coefficient versus frequency for 7 holes formed in a 20 mm×20 mm array. An absorption peak is observed at approximately 500 Hz. Line 22 is a curve plotting the absorption coefficient versus frequency for 16 similarly sized holes arranged in an array having a cell size of 10 mm×10 mm. The absorption peak is observed to occur between 800 Hz and 1000 Hz.

Figure 3:
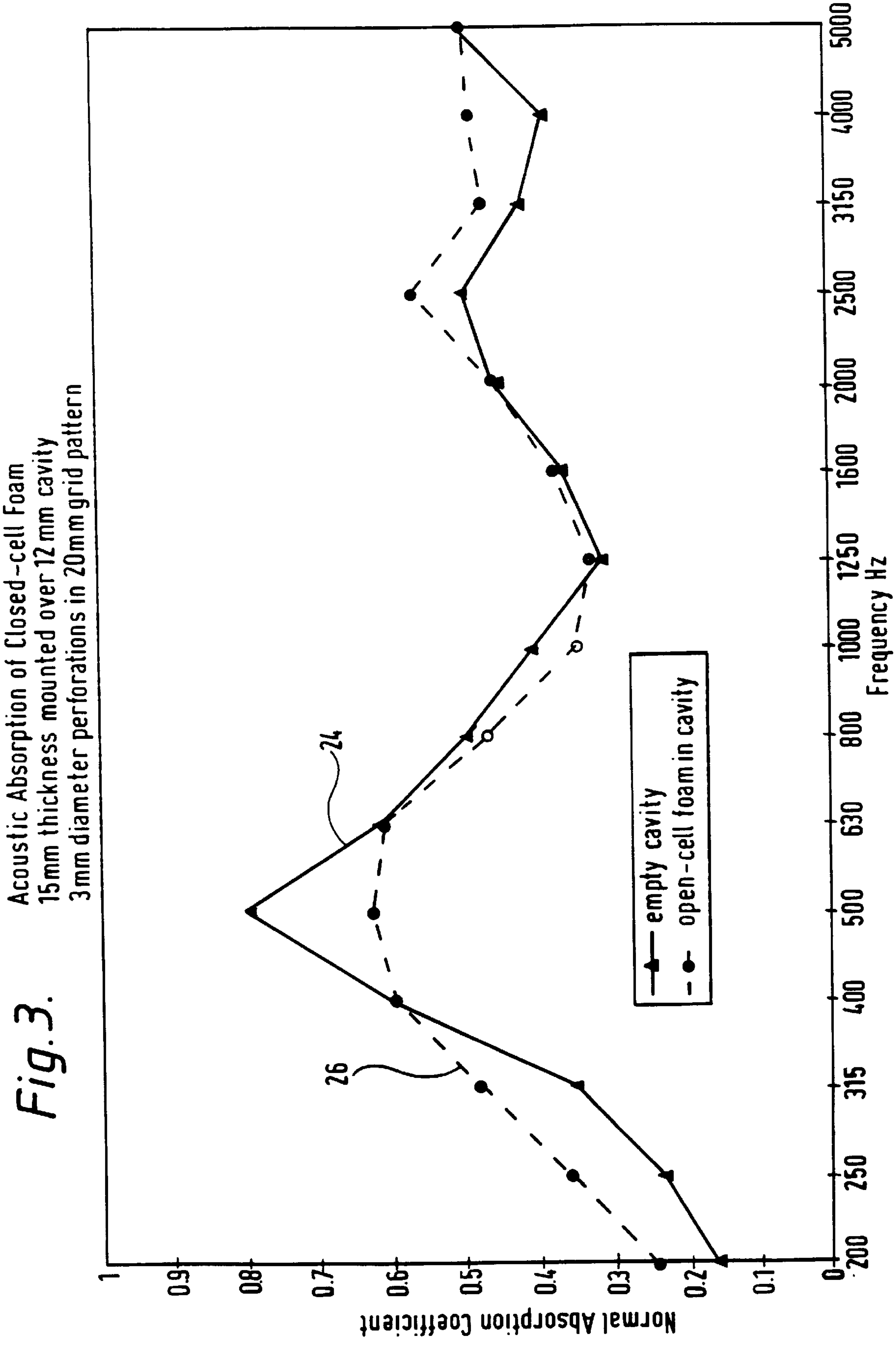
FIG. 3 is a graph comparing, absorption coefficient versus frequency for a perforated closed cell material backed with a 12 mm air gap and with an open cell foam filling the 12 mm air gap.

FIG. 3 compares the relative performance when the 12 mm air gap is replaced by a 12 mm thick open cell foam structure. Line 24 represents the absorption coefficient for the air gap, whereas line 26 represents the absorption curve when the open cell foam is used. The inclusion of foam reduces the absorption coefficient from a peak value of 0.8 to approximately 0.6, but does result in improved low frequency absorption. Thus, in this example, the value at which the absorption coefficient reaches 0.3 is approximately 220 Hz when the open cell foam is used, whereas the air gap alone does not achieve this absorption coefficient until a frequency of approximately 280 Hz. The comparison also demonstrates that inclusion of the foam provides improved absorption in the range of 2 to 5 kHz. It should be noted that the absorption measurements were only made at discrete frequencies having ⅓ octave spacings and consequently the above values are interpreted from FIG. 3.

Figure 4:
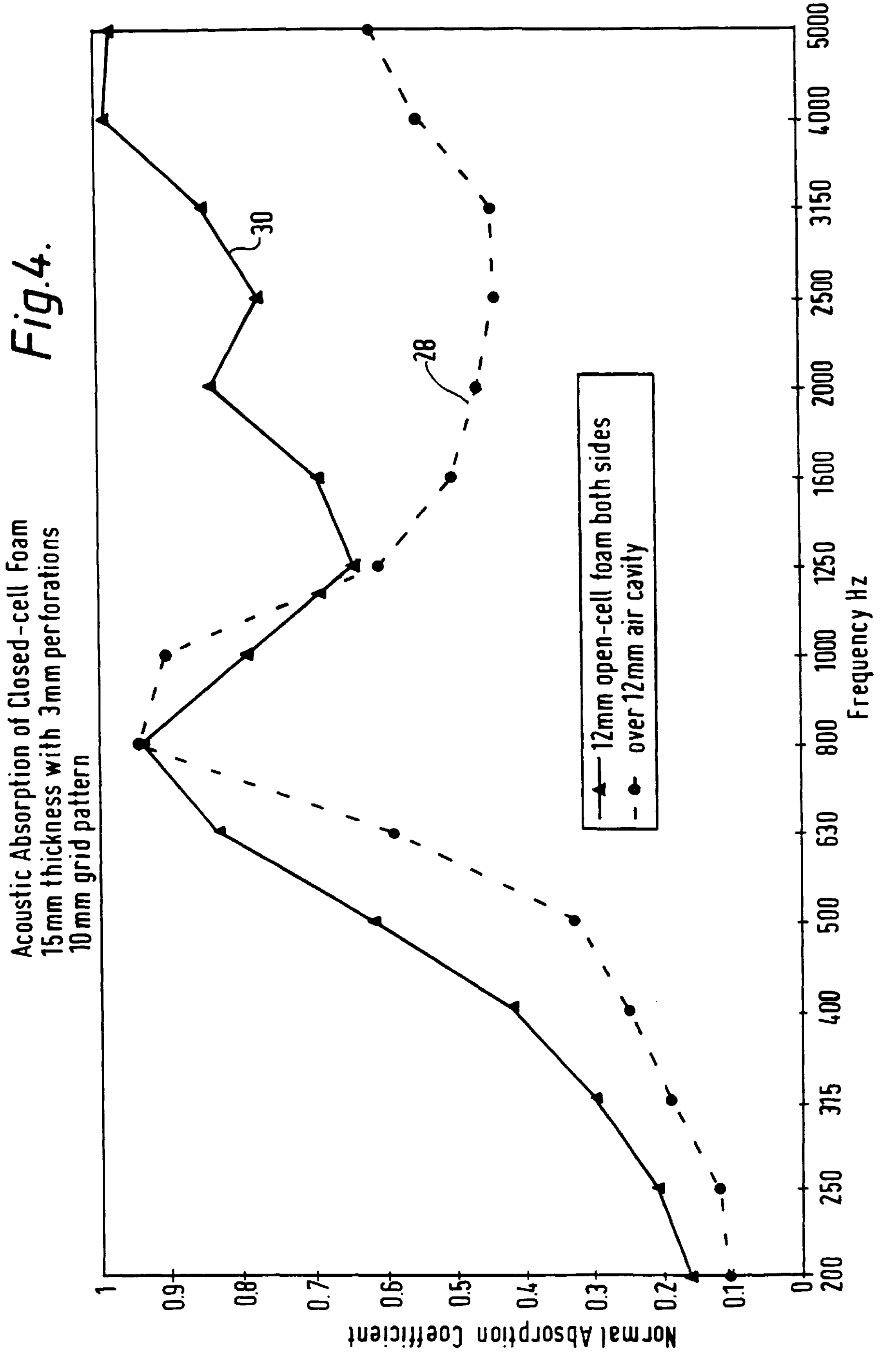
FIG. 4 is a graph comparing the absorption coefficient versus frequency for closed call foam, 15 mm thick with 3 mm diameter holes in a 10×10 mm array backed by a 12 mm air gap and the same foam having 12 mm of open cell foam commercially available from the applicant as PS23 on the front fare thereof and also filling the air gap.

FIG. 4 is a graph comparing the absorption characteristics for a 15 mm thick closed cell foam having 3 mm diameter boles in a 10 mm×10 mm array, backed by a 12 mm air gap (line 28), and the same material when the air gap is filled with an open cell foam commercially available as PS23 and a layer of PS23 is also provided on the front fact thereof (line 30). PS23 is an open cell flexible polyurethane foam having a density of 23 kg $m^{-3}$. Once again, the inclusion of open cell foam in the air gap enhances absorption at low frequencies (i.e from 200 to 600 Hz) and also result in a considerable improvement in absorption between 2 and 5 kHz. Much of this high frequency absorption is however attributable to the layer of foam provided on the front surface. It should be noted that PS23 does include a proportion of closed calls. However, other damping materials may be used, such as fire retardant foams, polyester or glass fibres or fabrics. Facings or membranes may be used where the panel is to be used in engine compartments or contaminated environments.

Figure 5:
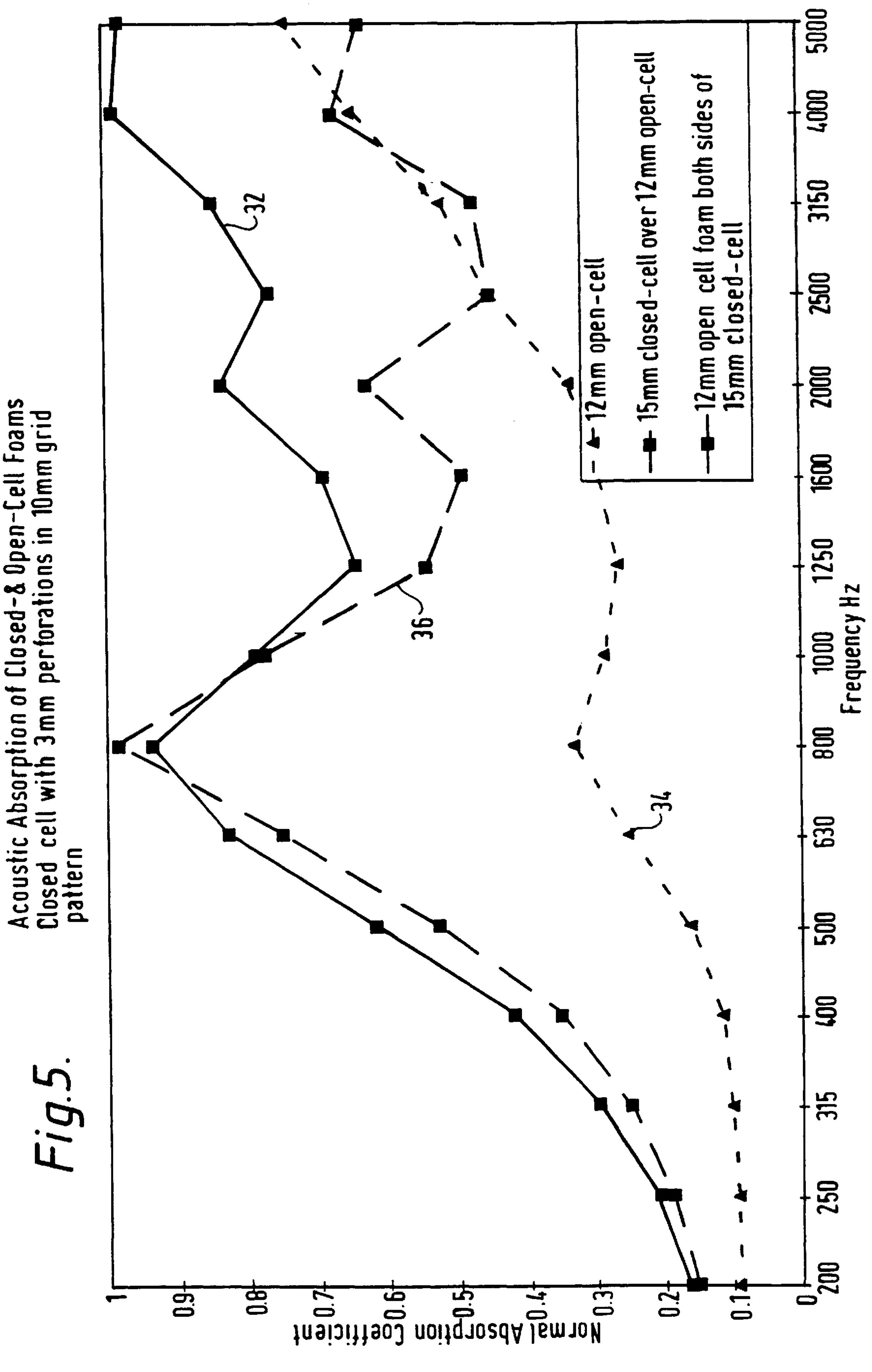
FIG. 5 is a graph illustrating the absorption coefficient versus frequency of a 12 mm thick layer of open cell foam (pritex PS23), 12 mm of PS23 in the air gap behind a sheet of closed cell foam, 15 mm thick with 3 mm diameter holes in a 10×10 mm array, and a sandwich of the same foam enclosed on both sides by 12 mm of PS23.

FIG. 5 illustrates a number of absorption characteristics and, in particular, the benefit derived by the addition of open cell foam to the face of the acoustic panel. Line 32 represents absorption characteristic versus frequency for the sandwich of closed cell foam enclosed between layers of 12 mm thick PS23 (as shown in FIG. 4). Line 34 represents the characteristic of a single layer of PS23, 12 mm thick, and line 36 represents the performance of 12 mm of PS23 in combination with perforated closed cell foam.

It can be seen from line 34 that the PS23 provides increasing attenuation above 2 kHz. The combination of closed cell foam backed by PS23 gives rise to strong attenuation at approximately 800 Hz, but maintains a respectable absorption coefficient in the region of 0.4 to 0.6 between 1.6 and 5 kHz, whereas the composite sandwich of closed cell foam plus two layers of PS23 provided the best acoustic performance.

The resonant frequency can be varied by varying the cross-section of the channels. Furthermore, the cross-section of the channel can be tapered. It is believed that this would enhance performance to non-normal directions of incidence. However this would probably cause the performance to deviate from the theoretical performance by an increased amount and it is expected that empirical investigations would be needed in order to effectively quantify the channel size and spacing required to obtain a given resonant frequency. The channels facing across the acoustic element may be varied, causing different parts of the element to exhibit maximum absorption at different frequencies.

The element may be thermo-formed to act as the headlining (internal roof element) of an automobile in order to reduce noise within the passenger compartment thereof. The element is sufficiently rigid to be self-supporting, thereby enabling it to be used without requiring attachment to the vehicle other than around its periphery.

Figure 6:
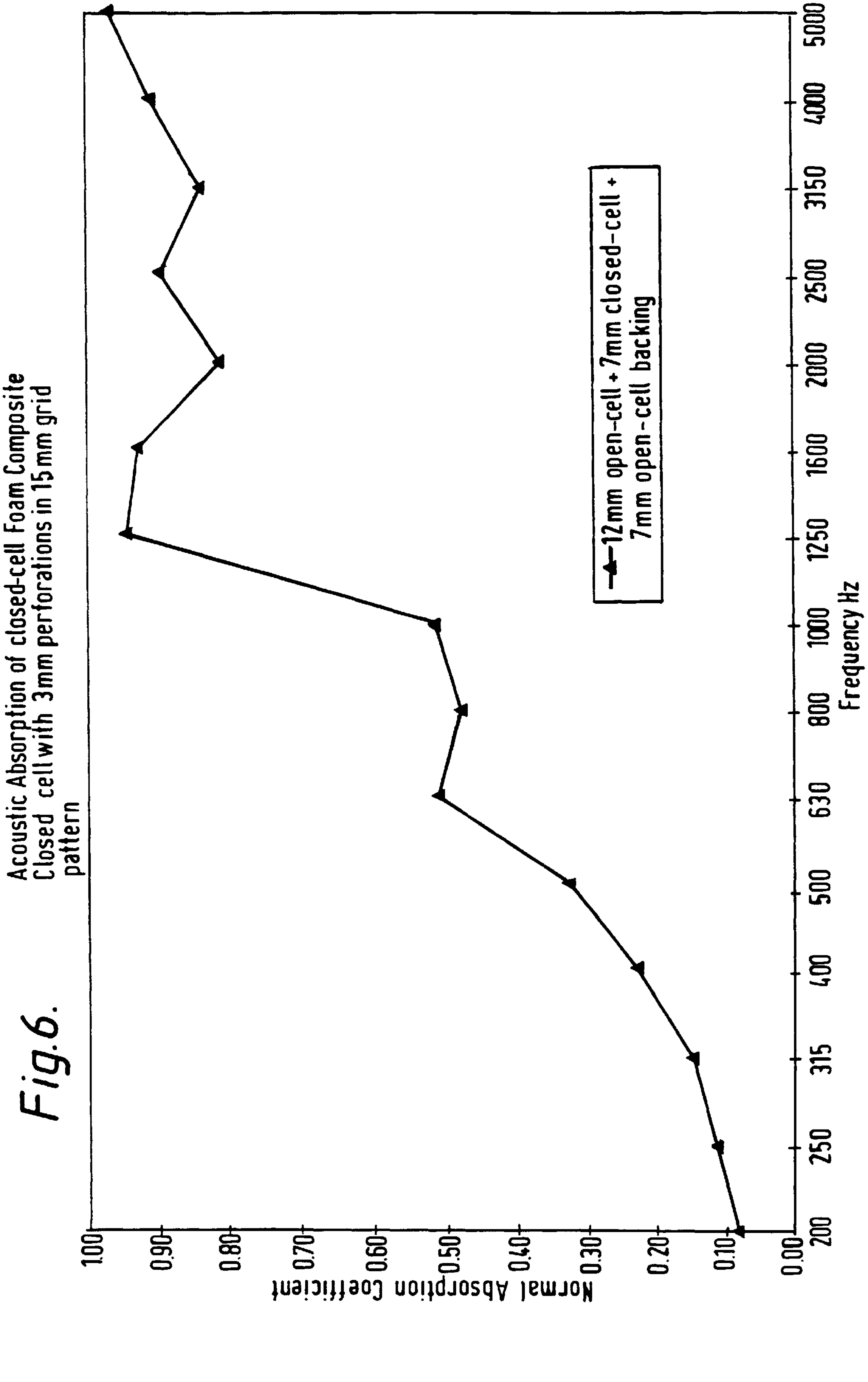
FIG. 6 is a graph illustrating the absorption versus frequency characteristics of a vehicle headliner constituting an embodiment of the present invention.

FIG. 6 illustrates the absorption characteristic for a prototype vehicle headliner comprising a 12 mm thick layer of open cell polyurethane foam (PS23) overlying a 7 mm thick layer of closed cell polyurethane foam having 3 mm diameter channels formed therein on a 15 mm×15 mm grid spacing. The closed cell foam is held from a acoustically reflective surface (i.e the vehicle roof) by a 7 mm air gap. It can be seen that the absorption characteristic rises simply to absorption coefficient values in the range of 0.8 to 0.95 for frequencies between 1250 Hz and 5 kHz. The Helmholtz resonator is designed to provide maximum absorption at 1250 Hz thereby extending the effective performance range from a typical 2 kHz and above for conventional materials having an overall thickness of 26 mm. to a much improved range of 1250 Hz and above, for the same thickness.

In a variation of the above embodiments, the open cell foam layer ad the closed cell foam layer may be formed as a unitary component by using different moulding conditions, ie. amount of filler or gaps, for each layer.

In a further embodiment of the invention, the foam layer 2 having the channels 4 thereon is faced with an electrically conductive layer 40. Such a layer 40 may be provided by aluminium foil. The layer 40 may typically be between 12 and 500 microns thick, although thickness outside of this range may also be employed. The aluminium foil provides radio frequency suppression and also heat reflection. Such an embodiment is particularly suited for provision in the bonnet (hood) 42 of a vehicle. The heat reflective and radio frequency interference suppression properties allow the bonnet to be made of plastics, whilst still giving adequate RFI suppression. The foam 2 also provides sound attenuation.

I claim:

1. A sound attenuating element comprising a closed cell foam layer having a plurality of channels extending there through from a first side of the foam layer to a second side of the foam layer wherein said second side positioned adjacent an opposing surface so as to define a gap between said second side and said opposing surface, and wherein said gap comprises a plurality of associated volumes, each of said associated volumes being in communication with one of said plurality of channels so as to form a Helmholtz resonator, said gap having an open cell foam or a fibrous material therein so as to reduce a quality factor of the acoustic response of the Helmholtz resonators, thereby broadening a frequency acceptance bandwidth of the resonators, and in which the closed cell foam layer has a thickness greater than 5 mm.

2. The sound attenuating element as claimed in claim 1, further comprising a layer of open cell or fibrous material attached thereto, a surface of the open cell material remote from the foam layer being adapted to or being attached to a layer substantially inhibiting gas flow.

3. The sound attenuating element as claimed in claim 1, in which the element has a first and a second portion having different attenuation characteristics.

4. The sound attenuating element as claimed in claim 3, in which the first and second portions have one or more of differing inter-channel spacings, differing channel diameters and differing channel lengths, so as to tune the Helmholtz resonators to different frequencies.

5. The sound attenuating element as claimed in claim 1, in which the foam layer is a thermoplastic material.

6. The sound attenuating element as claimed in claim 1, in which the foam layer is rigid.

7. The sound attenuating element as claimed in claim 1, further comprising an open cell or fibrous material attached to at least a portion of the first surface thereof.

8. The sound attenuating element as claimed in claim 7, further comprising an open cell or fibrous material attached to at least a portion the second surface thereof.

9. The sound attenuating element as claimed in claim 7, in which the open cell or fibrous material has an attenuating characteristic that increases with increasing acoustic frequency.

10. The sound attenuating element as claimed in claim 1, further comprising an electrically conducting layer.

11. A vehicle headlining comprising the sound attenuating element as claimed in claim 1.

12. A method of attenuating sound comprising the step of placing the sound attenuating element as claimed in claim 1 adjacent the opposing surface.

* * * * *